(12) United States Patent
Savino et al.

(10) Patent No.: US 7,541,397 B2
(45) Date of Patent: Jun. 2, 2009

(54) URETONIMINE-MODIFIED ISOCYANATE COMPOSITION AND METHOD OF FORMING THE SAME

(75) Inventors: Thomas Savino, Northville, MI (US); Sandra Bananto, Dearborn, MI (US)

(73) Assignee: BASF Corporation, Florham Park, NJ (US)

(*) Notice: Subject to any disclaimer, the term of this patent is extended or adjusted under 35 U.S.C. 154(b) by 211 days.

(21) Appl. No.: 11/276,693

(22) Filed: Mar. 10, 2006

(65) Prior Publication Data
US 2007/0213432 A1 Sep. 13, 2007

(51) Int. Cl.
C08K 5/34 (2006.01)
C08G 18/08 (2006.01)

(52) U.S. Cl. .................. 524/99; 524/589
(58) Field of Classification Search .......... 524/99, 524/589
See application file for complete search history.

(56) References Cited

U.S. PATENT DOCUMENTS

| | | | |
|---|---|---|---|
| 3,260,702 A | 7/1966 | Murakami et al. |
| 3,281,446 A | 10/1966 | Manning |
| 3,330,849 A | 7/1967 | Ulrich |
| 3,960,950 A | 6/1976 | Hansen |
| 3,970,680 A | 7/1976 | Holland |
| 4,072,712 A | 2/1978 | Meisert et al. |
| 4,120,884 A | 10/1978 | Woerner et al. |
| 4,177,205 A | 12/1979 | Schaaf et al. |
| 4,199,524 A | 4/1980 | Schaaf et al. |
| 4,260,554 A | 4/1981 | Ohlinger et al. |
| 4,340,533 A | 7/1982 | Rody |
| 4,487,964 A | 12/1984 | Watson, Jr. et al. |
| 4,587,301 A | 5/1986 | Watson, Jr. et al. |
| 4,625,052 A | 11/1986 | Konig et al. |
| 4,677,154 A | 6/1987 | Narayan et al. |
| 4,677,221 A | 6/1987 | Muller et al. |
| 4,743,626 A | 5/1988 | Narayan |
| 5,070,137 A | 12/1991 | Kase et al. |
| 5,117,059 A | 5/1992 | Tylor |
| 5,352,400 A | 10/1994 | West |
| 5,354,888 A | 10/1994 | Scholl |
| 5,357,021 A | 10/1994 | Tye et al. |
| 5,359,129 A | 10/1994 | Shimizu et al. |
| 5,504,241 A | 4/1996 | Pohl et al. |
| 2005/0032947 A1 | 2/2005 | Takahashi et al. |
| 2005/0282993 A1* | 12/2005 | Rosthauser et al. ........... 528/59 |
| 2006/0025557 A1* | 2/2006 | Wershofen et al. ............ 528/44 |

FOREIGN PATENT DOCUMENTS

| | | |
|---|---|---|
| EP | 0 351 873 A2 | 1/1990 |
| EP | 0 538 500 A1 | 4/1993 |
| EP | 1 514 897 A1 | 3/2005 |
| JP | 08067662 A | 12/1996 |

OTHER PUBLICATIONS

"Hindered Amino Ethers: A New Class of Radical Scavengers for Coatings" Proceedings of the Water-Borne and Higher-Solids Coatings Symposium (1990), 17th pp. 240-261.
"Mechanisms of Thermooxidative Stabilization With HAS" Gugumus, F. Ciba-Geigy AG, Basel, Switz. Polymer Degradation and Stability (1994), 44(3), pp. 299-322.
"Stabilization Mechanisms of Hindered Amines" Klemchuk, Peter P.; Gande, Matthew E. CIBA-GEIGY Corp., Ardsley, NY, USA. Polymer Degradation and Stability (1988), 22(3), pp. 241-274.
Photooxidation of Fire Retarded Polypropylene. III. Mechanism of HAS Inactivation. Sinturel, Christophe; Lemaire, Jacques; Gardette, Jean-Luc. Laboratoire de Photochimie Moleculaire et Macromoleculaire UMR CNRS 6505, Universite Blaise Pascal et ENS de Chimie de Clermont-Ferrand, Aubiere, Fr. European Polymer Journal (2000), 36(7), pp. 1431-1443.
"Synthesis and Thermal Stability of Alkoxyamines" Polymer Degradation and Stability 55 (1997) pp. 323-327.

* cited by examiner

Primary Examiner—Mark Eashoo
Assistant Examiner—Noah Frank
(74) Attorney, Agent, or Firm—Fernando A. Borrego; Howard & Howard Attorneys PLLC

(57) ABSTRACT

A uretonimine-modified isocyanate composition having reduced color and a method of forming the same is disclosed. The method of forming the uretonimine-modified isocyanate composition comprises providing a polyisocyanate composition having two or more isocyanate groups and reacting the polyisocyanate composition at a temperature in a range of from about 80° C. to about 130° C. and in the presence of a catalyst. The reaction of the polyisocyanate composition is quenched with a quenching agent and a color inhibitor having a low basicity and having at least one hindered amine group is added. The uretonimine-modified isocyanate composition has a color value corresponding to an a* value of greater than about −10 and a b* value less than about 10 as defined by CIE L*a*b* (CIELAB) Color Space Specification and undergoes a % NCO group decrease of less than about 6 %.

35 Claims, No Drawings

URETONIMINE-MODIFIED ISOCYANATE COMPOSITION AND METHOD OF FORMING THE SAME

BACKGROUND OF THE INVENTION

1. Field of the Invention

The subject invention relates to a uretonimine-modified isocyanate composition and method of forming the same. More specifically, the subject invention relates to a uretonimine-modified isocyanate composition having reduced color and a method of forming the uretonimine-modified isocyanate composition having the reduced color.

2. Description of the Related Art

Various uretonimine-modified isocyanate compositions, also known as carbodiimide-modified isocyanate compositions, are known. These compositions generally comprise a polyisocyanate composition having two or more isocyanate groups and comprising 4,4'-diphenylmethane diisocyanate (MDI) and a catalyst for catalyzing a reaction of the isocyanate groups to form carbodiimides. The carbodiimides then react with available isocyanate groups to form uretonimine and uretonimine oligomers. Once the reaction has achieved a desired level, generally based upon a percent NCO groups remaining, a quenching agent may be added to quench the catalyst used to promote the reaction of the isocyanate groups, thus inhibiting the formation of additional carbodiimides thereby inhibiting additional formation of uretonimine and uretonimine oligomers. Examples of quenching agents that have been employed include strong acids, such as trifluoromethane sulfonic acid or perchloric acid in U.S. Pat. No. 4,260,554. Other examples include weaker acids, such as Lewis acids, aromatic carboxylic acid halides, aromatic sulfonic acid esters and the like in U.S. Pat. No. 4,120,884.

Generally, it has been known to quench the reaction with a very strong acid to prevent, inhibit, or retard continued reaction of the isocyanate groups over time. However, the addition of the strong acid results in the uretonimine-modified composition becoming colored, typically yellow, orange, or brown. Any isocyanate products or articles formed from the colored uretonimine-modified composition generally have the same color. Therefore, the articles may require additional processing to disguise the color or additional amounts of pigment are necessary to overcome the prior color of the uretonimine-modified composition.

The weaker acids, while affording lower color uretonimine-modified compositions, generally do not adequately deactivate the catalyst. Therefore, the stability of the composition is undesirable and the composition must be used within a shorter period of time. If the composition is used after the stability of the composition has been compromised, then articles formed therefrom are susceptible to being rejected as non-conforming.

Attempts have been made to reduce coloration of polyisocyanate compositions. In U.S. Pat. No. 5,359,129 to Shimizu et al., a hindered amine compound is used to prevent coloration of diphenylmethane diisocyanate. However, the hindered amine compound has two phenyl groups each having a hydroxyl group, thereby resulting a basic compound. The '129 patent does not disclose utilizing the hindered amine compound with uretonimine-modified isocyanate compositions. Since uretonimine-modified isocyanate compositions include catalysts and quenching agents, adding the basic hindered amine compound would unfavorably interact with the quenching agents. As the amount of quenching agent available to deactivate the catalyst is reduced, the catalyst can further catalyze the reaction of the isocyanate groups and the stability of the uretonimine-modified isocyanate composition is reduced. Uretonimine-modified isocyanate compositions formed with the hindered amine compound of the '129 patent are likely to be unacceptable in typical manufacturing processes.

Various other stabilizers have been used with pure diphenylmethane diisocyanate, i.e., not uretonimine-modified isocyanate compositions. For example, U.S. Pat. No. 4,677,154 to Narayan et al. discloses an additive stabilizer package comprising 2,6-di-(t-butyl)-p-cresol and a compound selected from the group consisting of tris(nonylphenyl) phosphite, tetrakis(2,4-di-ti-butylphenyl)-4,4'-biphenylene diphosphonite, bis(2,4-di-t-butylphenyl)pentaerythritol disphosphite, 2,2'-oxamido-bis-distearyl thiodipropionate, triisodecyl phosphite, trilauryl trithiophosphite, distearyl pentaerythritol, 2,2'-ethylene bis(4,6-di-tertiaryburylphenol), octadecyl 3-(3',5'-di-t-butyl4'-hydroxyphenyl) propionate, 4,4'-thio-bis(2-t-butyl-5-methylphenol), 4,4'-thio-bis(2-t-butyl-5-methylephenol), 2,2'-methylene-bis-(4-methyl-6-t-butylphenol), tris (3,5-di-tributyl4-hydroxybenzyl) isocyanurate, phenothiazine, tris(2,4-di-tbutylphenyl)phosphite, 4,4'-methylene bis (2,6-di-t-butylphenol), 2,6-di-t-butyldimethylaminomethylphenol and blends thereof. However, the stabilizer package is not exposed to the processing conditions of the uretonimine-modified isocyanate compositions, specifically, the catalyst and the quenching agent.

Accordingly, it would be advantageous to provide a composition that overcomes the inadequacies that characterize the related art.

SUMMARY OF THE INVENTION

The subject invention provides a uretonimine-modified isocyanate composition having reduced color and a method of forming the same. The method of forming the uretonimine-modified isocyanate composition comprises providing a polyisocyanate composition having two or more isocyanate groups and comprising 4,4'-diphenylmethane diisocyanate (MDI) and reacting the polyisocyanate composition at a temperature in a range of from about 80° C. to about 130° C. and in the presence of a catalyst such that the isocyanate groups form carbodiimides that undergo further reaction to form uretonimine and/or uretonimine oligomers. The reaction of the polyisocyanate composition is quenched with a quenching agent to inhibit formation of additional carbodiimides thereby inhibiting additional formation of uretonimine and/or uretonimine oligomers. A color inhibitor having a low basicity and having at least one hindered amine group is added to reduce the color of the uretonimine-modified isocyanate composition.

The uretonimine-modified isocyanate composition after formation may comprise uretonimine and/or uretonimine oligomers and the color inhibitor. The uretonimine-modified isocyanate composition has a color value corresponding to an a* value of greater than about −10 and a b* value less than about 10 as defined by CIE L*a*b* (CIELAB) Color Space Specification. The visual appearance of the uretonimine-modified compositions of the subject invention with these CIE L*a*b* values ranges from pale yellow to nearly colorless. Further, the uretonimine-modified isocyanate composition is stable and undergoes a % NCO group decrease of less than about 6%.

As compared to related art processes and composition, the uretonimine-modified isocyanate composition has a reduced color and good storage stability. The uretonimine-modified isocyanate composition can also be used to produce articles that have little color. Thus, lower amounts of pigments, if any at all, will be needed to produce colored articles or to disguise the coloration of the uretonimine-modified isocyanate composition. Additionally, the composition of the subject invention performs adequately in stability testing and outperforms commercially available uretonimine-modified isocyanate compositions.

DETAILED DESCRIPTION OF THE INVENTION

A method of producing a uretonimine-modified isocyanate composition is disclosed. The method of producing the uretonimine-modified isocyanate composition includes the step of providing a polyisocyanate composition having two or more isocyanate groups and comprising 4,4'-diphenylmethane diisocyanate (MDI). It is known that 4,4'-MDI is also referred to as bis(4-isocyanatophenyl)methane or 4,4'-methylenediphenyl diisocyanate. As used herein, the terms "isocyanate composition" and "composition" are intended to refer to the uretonimine-modified isocyanate composition.

The 4,4'-MDI is present in an amount of from about 1 to less than about 99.5 parts by weight based on 100 parts by weight of the polyisocyanate composition. Preferably, the 4,4'-MDI is present in an amount of from about 35 to about 98 parts by weight, and more preferably from about 50 to about 98 parts by weight, both based on 100 parts by weight of the polyisocyanate composition. It is to be appreciated that different initial amounts of the 4,4'-MDI will generally produce different types of uretonimine-modified isocyanate compositions. The 4,4'-MDI can be produced by any of the commonly employed processes including the distillation of crude mixtures of isocyanate obtained by phosgenating a mixture of polyamines generally obtained by acid condensation of aniline and formaldehyde.

Generally, in addition to the 4,4'-MDI, the polyisocyanate composition may also comprise 2,4'-MDI, 2,2'-MDI, and other isomers. The 2,4'-MDI and the 2,2'-MDI are less reactive than the 4,4'-MDI and when combined with 4,4'-MDI in certain ratios afford compositions that are liquids at room temperature. It has previously been known to add small amounts of either the 2,4'-MDI and the 2,2'-MDI to the 4,4'-MDI to improve the stability of the polyisocyanate composition. For example, commercially pure 4,4'-MDI has about 98 parts by weight 4,4'-MDI and up to 2 parts by weight 2,4'-MDI. The subject invention provides the 2,4'-MDI present in an amount of greater than 0.5 to about 60 parts by weight based on 100 parts by weight of the polyisocyanate composition. Preferably, the 2,4'-MDI is present in an amount of from about 1 to about 50 parts by weight, and more preferably, from about 2 to about 40 parts by weight, both based on 100 parts by weight of the polyisocyanate composition To form the uretonimine-modified isocyanate composition, the polyisocyanate composition is reacted at a temperature of greater than about 80° C., preferably from about 80° C. to about 130° C., and more preferably from about 100° C. to about 120° C. The temperature of the polyisocyanate composition may be raised using standard techniques, such as heat baths, ovens, burners, etc.

The polyisocyanate composition is also reacted in the presence of a catalyst such that the isocyanate groups of MDI react to first form carbodiimides. The catalyst is present in amounts of from about 2 to about 500 parts per million. The amount of catalyst depends on the reaction temperature such that the reaction temperature remains near the desired reaction temperature and that the reaction occurs in a desired amount of time. Preferably, the catalyst is present in an amount of from about 5 to about 100 parts per million. As appreciated by those of ordinary skill in the art, the catalyst may participate in the reaction and may also remain in the uretonimine-modified isocyanate composition. Alternatively, the catalyst may be filtered or removed. The catalyst catalyzes the formation of the carbodiimides and does not substantially interact with the reaction of the carbodiimides and the polyisocyanate composition or the uretonimines. The uretonimine-modified compositions of the present invention may be prepared using any of the known carbodiimide-promoting compounds as the catalyst. The catalyst is selected from at least one of phospholene, phospholene oxide, phospholidine, phospholidine oxide, phosphate esters, and phosphine oxides. One example of a phospholidine includes 1-phenyl phospholidine and one example of phospholidine oxides includes 1-phenyl-phospholidine-1-oxide. Other suitable catalysts include phosphate esters, such as triethylphosphate, and phosphine oxides, such as tributylphosphine oxide.

Preferred catalysts are phospholene oxides, and most preferred are phospholene 1-oxides having the following formula:

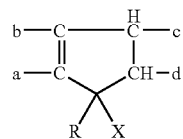

or the following isomeric form:

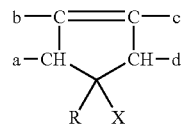

wherein a, b, c and d are each selected from one of hydrogen or hydrocarbyl from 1 to 12 carbon atoms inclusive, R is selected from one of lower alkyl or aryl and X is selected from one of oxygen or sulfur.

Representative compounds within this class of catalysts are 3-methyl-1-phenyl-3-phospholene-1-oxide, 3-methyl-1-phenyl-2-phospholene-1-oxide, 1-methyl-3-phospholene-1-oxide, 1-methyl-2-phospholene-1-oxide, 1-ethyl-3-phospholene-1-oxide, 1-ethyl-2-phospholene-1-oxide 1-phenyl-3-phospolene-1-oxide, and 1-phenyl-2-phospolene-1-oxide. Also, polymer bound catalysts, and especially polymer bound phospholene oxides, may be employed in the subject invention.

In addition, co-catalysts may also be used to ensure the desired reaction temperature and time. The co-catalyst is added in an amount of from about 50 to about 1500 parts per million, preferably from about 100 to about 1250, more preferably from about 200 to about 1000 parts per million. The co-catalyst is preferably a phosphite, comprised of aliphatic, aromatic, or mixed aliphatic and aromatic groups. Examples of preferred co-catalysts include triphenyl phosphite, tributyl phosphite, phenyl diisodecyl phosphite, and diphenyl isodecyl phosphite.

In addition, hindered phenol antioxidants, and especially 2,6-di-tert-butyl-hindered phenolic antioxidants, may be present in the polyisocyanate composition. Examples of phenolic antioxidants include 2,6-di-tert-butyl-4methylphenol, also known as BHT, and 3-(3,5-di-tert-butyl-4-hydroxyphenyl)propanoate, available commercially as Irganox® 1076.

Hindered phenolic antioxidants are commonly used as stabilizers for commercial polyisocyanate compositions, and thus may be present when employed in forming the uretonimine-modified isocyanate composition of the subject invention. If the hindered phenolic antioxidants are not present in the polyisocyanate composition, then they may also be added before or after the reaction to form carbodiimide, uretonimine, and uretonimine oligomers.

It is to be appreciated by those of ordinary skill in the art that only a portion of the isocyanate groups may react to form the carbodiimides, however, all isocyanate groups may react. The carbodiimides can then react further with the isocyanate groups of unreacted MDI to form uretonimine and uretonimine oligomers.

Alternatively, the carbodiimide may also react with the isocyanate group of another molecule of uretonimine instead of unreacted MDI, to form a higher molecular weight, oligomeric uretonimine. For clarity, the term "uretonimine" is intended to mean 3-functional, six ring uretonimine oligomer because there is a single uretonimine group, as shown below. Additionally, "uretonimine oligomers" is intended to mean more than 3 functional groups, which have more than a single uretonimine group, as shown below.

The MDI forms uretonimines and uretonimine oligomers as a result of the reaction. In addition to reacting with MDI, other mono-, di-, tri-, tetra-isocyanates and other aromatic, aliphatic, and cycloaliphatic polyisocyanates and combinations thereof may react with the MDI. Examples of suitable monoisocyanates include phenyl isocyanates and cyclohexyl isocyanate. Examples of suitable diisocyanates include m-phenylene diisocyanate, 2,4-toluene diisocyanate, 2,6-toluene diisocyanate, mixtures of 2,4- and 2,6-toluene diisocyanate, hexamethylene diisocyanate, tetramethylene diisocyanate, cyclohexane-1,4-diisocyanate, hexahydrotoluene diisocyanate (and isomers), isophorone diisocyanate, hydrogenated diphenylmethane diisocyanate, naphthalene-1,5 diisocyanate, 1-methoxyphenyl-2,4-diisocyanate, 4,4'-biphenylene diisocyanate, 3,3'-dimethoxy-4,4'-biphenyl diisocyanate, 3,3'-dimethyl-diphenylmethane4,4'-diisocyanate, and tetramethylxylylene diisocyanate. Examples of suitable triisocyanates include 4,4',4"-triphenylmethane triisocyanate and toluene 2,4,6-triisocyanate. Examples of suitable tetraisocyanates include 4,4'-dimethyldiphenylmethane-2,2',5,5'-tetraisocyanate and examples of suitable polymeric polyisocyanates include polymethylene polyphenylene polyisocyanate.

The uretonimines formed in the reaction are a mixture of oligomers, including 3-functional, six ring uretonimine, 4-functional, ten ring uretonimine, and 5-functional, fourteen ring uretonimine. One possible reaction of the 4,4'-MDI while in the presence of the catalyst is shown below, which results in the formation of the 3-functional, six ring oligomer, 1,3-bis(4-(4-isocyanatobenzyl)phenyl)-4-(4-(4-isocyanatobenzyl)phenylimino)-1,3-diazetidin-2-one. The first step in this reaction is the formation of a carbodiimide intermediate, N,N'-methanediylidenebis-4-(4-isocyanatobenzyl)aniline from two molecules of 4,4-MDI. The carbodiimide may react further with another molecule of 4,4'-MDI to form a 3-functional, six ring uretonimine.

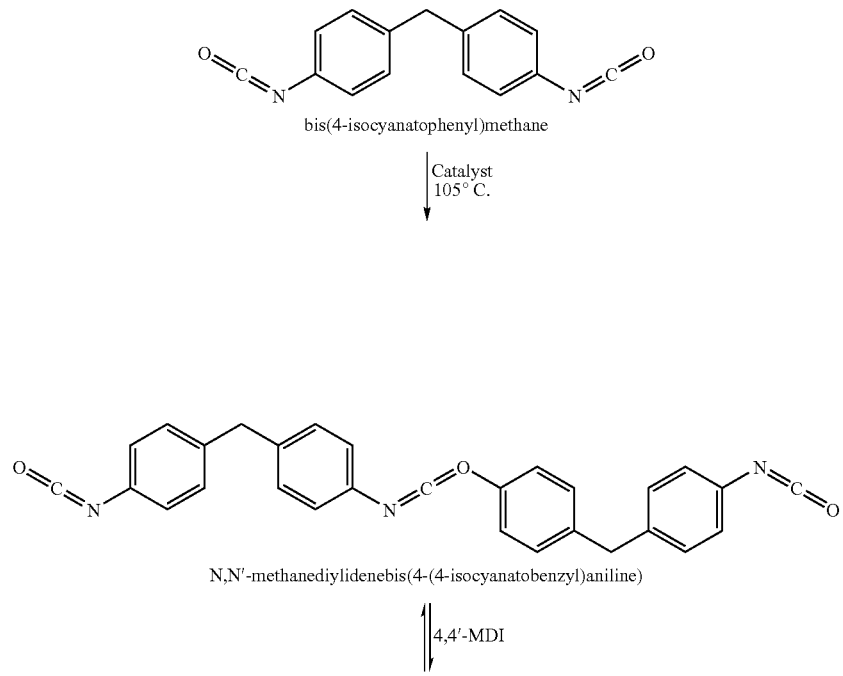

-continued

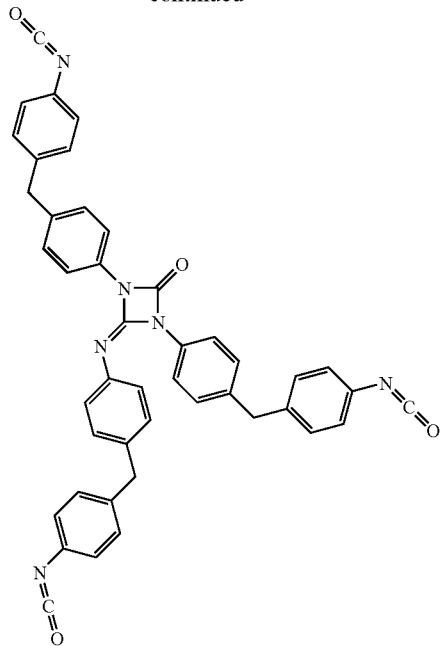

1,3-bis(4-(4-isocyanatobenzyl)phenyl)-4-(4-(4-isocyanatobenzyl)phenylimino)-1,3-diazetidin-2-one Below is an example of the 4-functional, ten ring uretonimine oligomer that may be formed as a result of the 3-functional uretonimine oligomer reacting with the carbodiimide of 4,4'-MDI.

Below is an example of the 5-functional, fourteen ring uretonimine oligomer that may be formed as a result of the 4-functional uretonimine oligomer reacting with the carbodiimide of 4,4'-MDI.

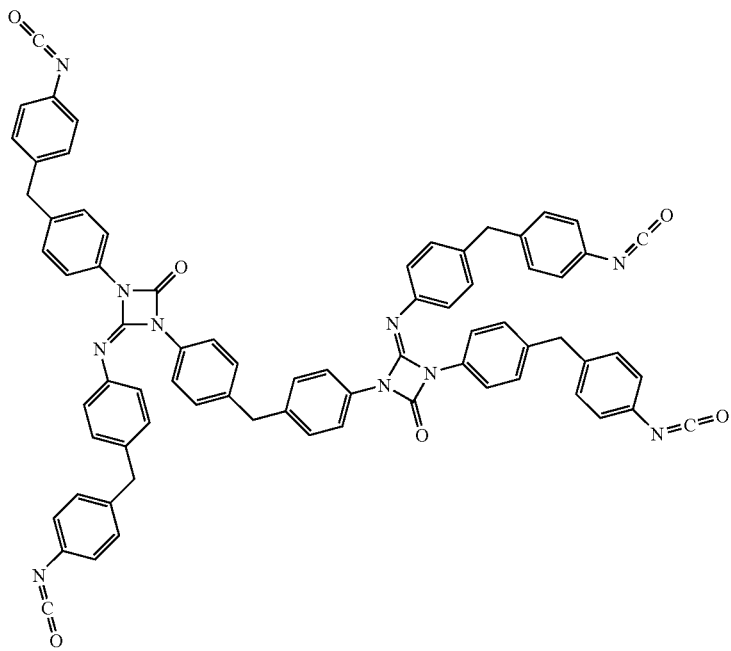

1-(4-(4-isocyanatobenzyl)phenyl)-3-(4-(4-(3-(4-(4-isocyanatobenzyl)phenyl)-2-(4-(4-isocyanatobenzyl)phenylimino)-4-oxo-1,3-diazetidin-1-yl)benzyl)phenyl)-4-(4-(4-isocyanatobenzyl)phenylimino)-1,3-diazetidin-2-one

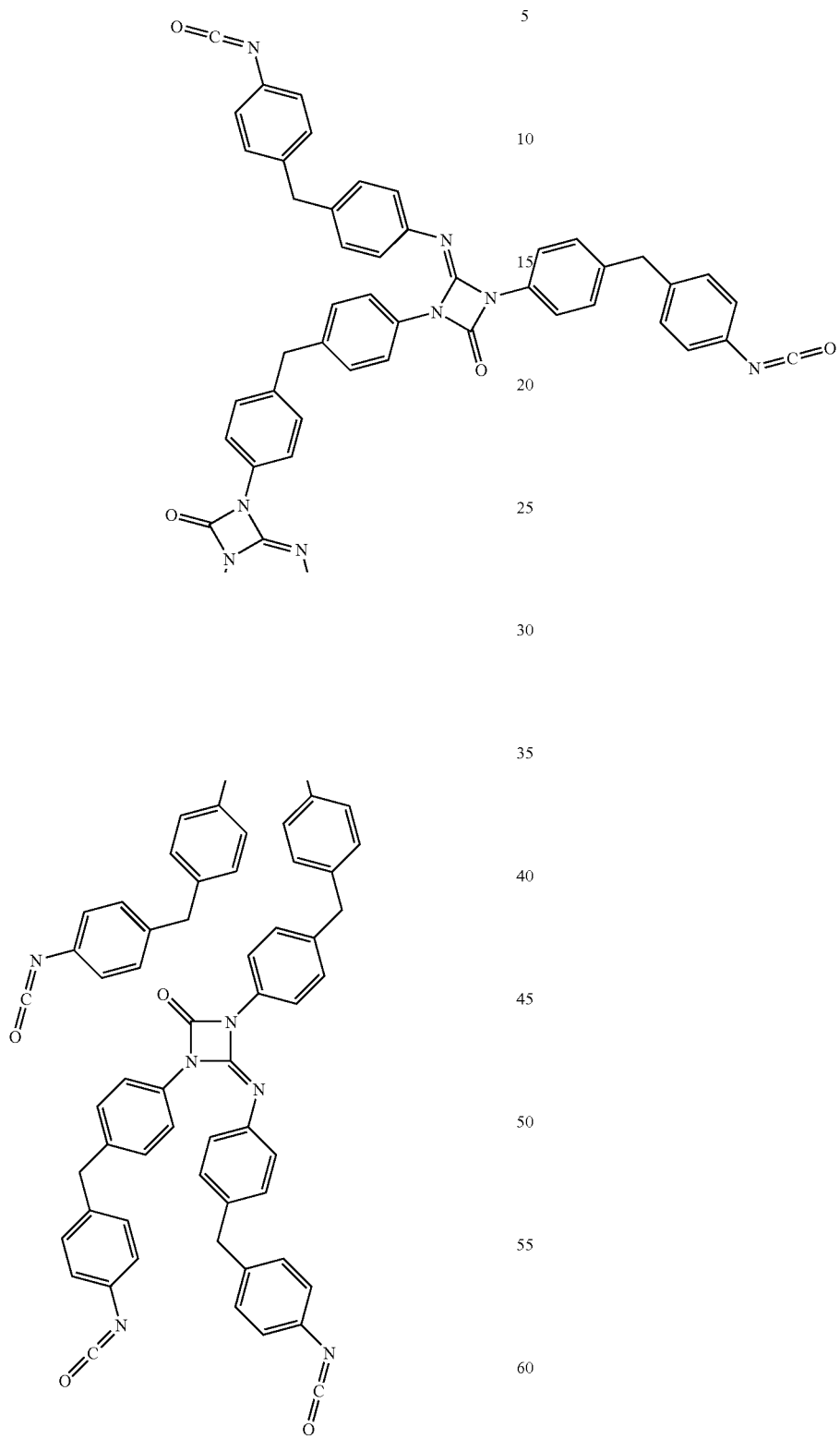
1-(4-(4-isocyanatobenzyl)phenyl)-3-(4-(4-(3-(4-(4-isocyanatobenzyl)phenyl)-2-(4-(4-(3-(4-(4-isocyanatobenzyl)phenyl)-2-(4-(4-isocyanatobenzyl)phenylimino)-4-oxo-1,3-diazetidin-1-yl)benzyl)phenylimino)-4-oxo-1,3-diazetidin-1-yl)benzyl)phenyl)-4-(4-(4-isocyanatobenzyl)phenylimino)-1,3-diazetidin-2-one The longer the reaction proceeds, the larger the amount of the higher-functional uretonimine oligomers, i.e., greater than 3-functional, that is formed. As more MDI is consumed and converted to uretonimines, the isocyanate value of the polyisocyanate composition is reduced because reactive isocyanate groups are reacted with one another. As understood by those of ordinary skill in the art, the isocyanate value refers to a weight percentage of reactive isocyanate groups in the polyisocyanate composition. The isocyanate value can be determined by the following, well-known equation:

$$\text{Isocyanate Value} = \% NCO \text{ groups} = \frac{42 \times f}{Mw} \times 100,$$

wherein 42 is the molecular weight of the NCO groups, $f$ is functionality and refers to the number of reactive groups in the polyisocyanate composition, and Mw is the molecular weight of the polyisocyanate. For example, 4,4'-MDI has a molecular weight of 250.26 and a functionality of 2 resulting in the isocyanate value, or % NCO groups, of 33.6.

The uretonimine-modified isocyanate composition also includes a color inhibitor. The color inhibitor may be added before or during reaction of the polyisocyanate composition or after quenching the reaction with the quenching agent. The color inhibitor has a low basicity and has at least one hindered amine group. Preferably, the color inhibitor has a $pK_B$ of greater than about 7. It is to be appreciated by those of ordinary skill in the art that $pK_B$ values of greater than about 7 are considered less basic, whereas values of less than 7 are considered more basic.

The color inhibitor may be selected from at least one of a hindered amino ether and a hindered amide. For example, one suitable hindered amino ether has the general formula:

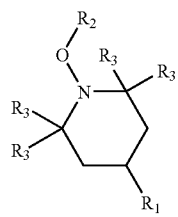

wherein $R_1$ is selected from one of a hydrogen atom, a $C_1$-$C_{12}$ group, or a $C_1$-$C_{10}$ group having at least one carboxyl group, $R_2$ is selected from one of a hydrogen atom or a $C_1$-$C_{12}$ group, and $R_3$ are the same or different and are selected from one of a hydrogen atom or a $C_1$-$C_8$ group.

One example of a suitable hindered amide has the general formula:

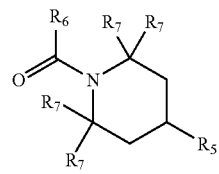

wherein $R_5$ is selected from one of a hydrogen atom, a $C_1$-$C_{12}$ group, or a $C_1$-$C_{10}$ group having at least one carboxyl group, $R_6$ is selected from one of a hydrogen atom or a $C_1$-$C_{12}$ group, and $R_7$ are the same or different and are selected from one of a hydrogen atom or a $C_1$-$C_8$ group.

One example of a hindered amide that may be used with the present invention is Tinuvin® 440 from Ciba Specialty Chemicals and has a $pK_B$ of about greater than 12.0.

As another example, the hindered amino ether may have at least two hindered amine groups and has the general formula:

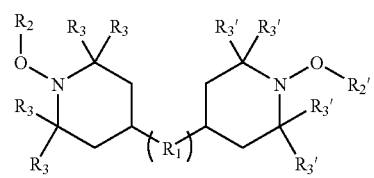

wherein $R_1$ is selected from one of a $C_1$-$C_{12}$ group or a $C_1$-$C_{10}$ group having at least one carboxyl group, $R_2$, $R_2'$ are the same or different and are selected from one of a hydrogen atom or a $C_1$-$C_{12}$ group, and $R_3$, $R_3'$ are the same or different and are selected from one of a hydrogen atom or a $C_1$-$C_8$ group.

Referring to either of the above formulas, $R_1$ may have the general formula:

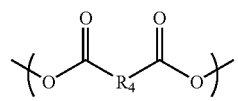

wherein $R_4$ is a $C_1$-$C_{10}$ group.

One example of a hindered amino ether is bis(2,2,6,6-tetramethyl-1-(octyloxy)piperidin-4-yl)decanedioate, which has the formula:

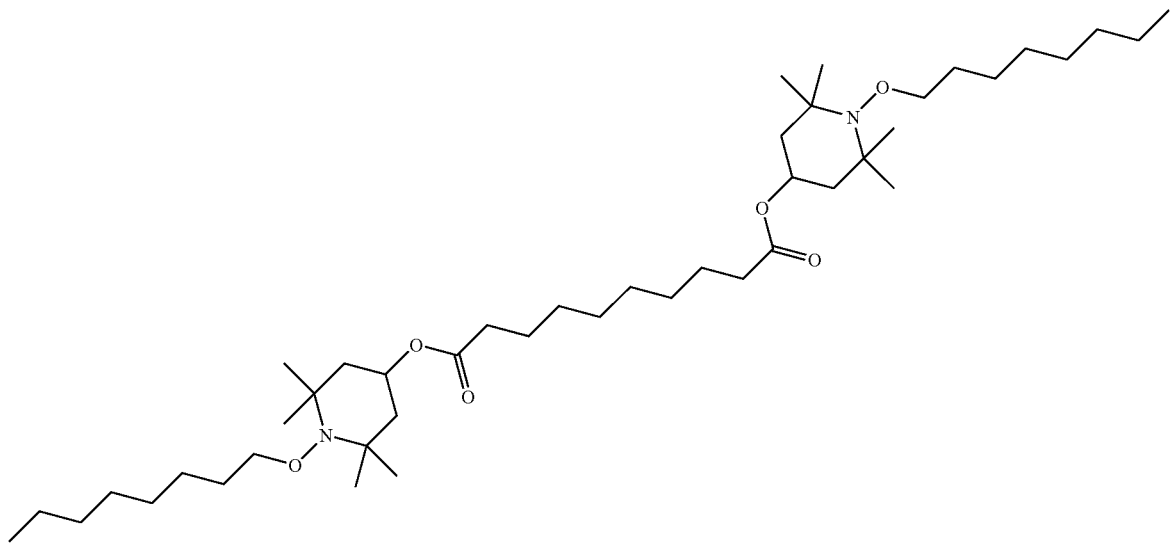

wherein $R_1$ is a $C_8$ group having two carboxyl end groups,
$R_2$, $R_2'$ are each $C_8$ groups, and
$R_3$, $R_3'$ are each methyl groups.

The most preferred hindered amino ether is commercially available as Tinuvin® 123 from Ciba Specialty Chemicals and has a $pK_B$ of about 9.6. It is believed that, without intending to be bound to theory, the carboxyl groups and the alkoxy groups, as shown in the above formula, contribute to the low basicity of the color inhibitor.

The color inhibitor is present in an amount of from about 50 to about 1500 parts per million based on the total parts of the uretonimine-modified isocyanate composition. More preferably, the color inhibitor is present in an amount of from about 100 to about 1000 parts per million based on the total parts of the uretonimine-modified isocyanate composition. The amount of color inhibitor present in the composition tends to effect the amount of color that is reduced.

The reaction of the polyisocyanate composition is then quenched with a quenching agent. Generally, it has been known to quench the reaction with a very strong acid to prevent, inhibit, or retard continued reaction of the isocyanate groups over time and to prevent the continued formation of additional carbodiimide and uretonimine and uretonimine oligomers during storage of the composition. The addition of the very strong acid results in the uretonimine-modified composition becoming colored, typically yellow, orange, or brown. Other known processes for producing uretonimine-modified compositions also result in the composition becoming yellow, such as high reaction temperature with other catalysts. Any articles formed from the colored uretonimine-modified composition generally have the same color. If the article is to be a different color, additional amounts of pigment are necessary to overcome the prior color of the uretonimine-modified composition.

The subject invention has discovered that the addition of the color inhibitor results in the uretonimine-modified isocyanate composition having reduced color and can even achieve nearly colorless levels. Without intended to be bound to theory, it is believed that the color inhibitor scavenges radicals that lead to formation of color through reaction with the catalyst. One method of determining the color of the uretonimine-modified isocyanate composition utilizes the well known CIE L*a*b* (CIELAB) Color Space Specification. The CIELAB has three values, L*, a*, and b*. L* represents lightness and darkness of a color, a* represents redness-greenness, and b* represent yellowness-blueness. Using the color inhibitor in producing the uretonimine-modified isocyanate composition results in a color value corresponding to an a* value of greater than about −10 and a b* value less than about 10. When the a* value is lower than −10, the uretonimine-modified isocyanate composition will be more green. When the b* value is greater than 10, the uretonimine-modified isocyanate composition is more yellow. The combination of a* and b* results in the prior art uretonimine-modified isocyanate compositions being yellow, brown, and orange. Preferably, the b* value of the subject invention is between from −−5 to about 7, and more preferably between about −2 to about 5. Preferably, the a* value of the subject invention is between from −5 to about 5, and more preferably between about −2 to about 0. The L* value typically remains from about 99 to 100. The visual appearance of the uretonimine-modified isocyanate compositions of the subject invention range from light pale yellow to nearly colorless.

It has previously been attempted to produce reduced color uretonimine-modified isocyanate compositions. However, these prior art uretonimine-modified isocyanate compositions were not stable. The subject invention has been able to achieve reduced color, while also maintaining the stability of the uretonimine-modified isocyanate composition. A stable uretonimine-modified isocyanate composition is one that undergoes a % NCO group decrease of less than about 6%. It is to be appreciated that it is desirable for any uretonimine-modified isocyanate composition formed according to the invention to have a % NCO decrease of less than 6% for the shelf life of the product. The shelf-life may vary depending upon certain applications, but is likely to not exceed more than five years. Over time, unstable uretonimine-modified isocyanate compositions tend to continue react forming additional carbodiimides, which may further react to form uretonimine and uretonimine oligomers thereby reducing the % NCO groups. The unstable uretonimine-modified isocyanate composition is then unsatisfactory for the particular application. Since the color inhibitor has a low basicity, the color inhibitor contributes to the stability of the uretonimine-modified isocyanate composition. It is important to note that if the color inhibitor employed is more basic, the color inhibitor may interact with the quenching agent thereby limiting the quenching of the catalyst. Since the catalyst is not sufficiently quenched, then the uretonimine-modified isocyanate composition is likely to fail stability testing.

The subject invention has also determined that it is advantageous to combine the color inhibitor with a dual-step quenching process to further reduce the color. More specifically, the dual-step quenching process comprises quenching with a first quenching agent followed by a second quenching agent different than the first quenching agent. The first quenching agent partially quenches the reaction of the isocyanate groups to inhibit formation carbodiimides thereby inhibiting formation of the uretonimine and uretonimine oligomers and the second quenching agent further quenches the reaction to further inhibit formation of carbodiimides thereby inhibiting additional formation of the uretonimine and uretonimine oligomers.

The addition of the first quenching agent occurs when the polyisocyanate composition is at a temperature of greater than about 80° C. Preferably, the first quenching agent is added as the polyisocyanate composition continues to react at a first temperature from about 80° C. to about 130° C. The temperature of the polyisocyanate composition is then reduced to a second temperature lower than the first temperature and the second quenching agent is added. Preferably, the second temperature is less than about 80° C. More preferably, the second temperature is in a range of from about 28° C. to about 75° C. Said another way, once the polyisocyanate composition has reached the second temperature in this range, the second quenching agent is added. The reduction of the temperature may occur by removing from a heat source or by active cooling as understood by those of skill in the art.

The dual quenching stages in combination with the color inhibitor reduce the coloration of the uretonimine-modified composition. In this manner, the uretonimine-modified composition can be formed that is low color or nearly colorless, as described above. The advantages of a low color or nearly colorless composition are numerous. First, any articles formed therefrom will also be low color or nearly colorless allowing for a more aesthetically pleasing article that has many more uses. Second, if the article is to be colored, it is likely that lower amounts of pigments will be required since the base composition is nearly colorless.

In order to reduce coloration, the first quenching agent has a pKa greater than the second quenching agent. Preferably, the first quenching agent is a first acid or acid generator having a pKa of greater than about −8.0. It is to be appreciated by those of ordinary skill in the art that the term "acid generator" refers to compositions that are able to generate an acid when exposed to nucleophilic substances, such as water, amines, ureas, alcohols, etc. One example of an acid generator is benzoyl halide, which generates hydrochloric acid when exposed to nucleophiles.

The first acid or acid generator is selected from at least one inorganic acid, carboxylic acid, peroxides, sulfinic acid, sulfonic acid, sulfonic acid halides and carboxylic acid halides. It is to be appreciated that the first acid or acid generator may include a solvent for dispersing the acid or acid generator. Suitable examples of the first acid or acid generator include, but are not limited to, hydrochloric acid, methanesulfonic acid, toluenesulfonic acid, sulfuric acid, sulfonic acid, acetic acid, oxalic acid, citric acid, formic acid, ascorbic acid, benzoic acid, thiophenol, peracetic acid, benzoyl chloride, and mixtures thereof. For example, methanesulfonic acid has a pKa of about −2.6, benzoic acid has a pKa of about 4.2, and hydrochloric acid has a pKa of about −8.0.

The amount of the first acid or acid generator may depend upon the amount and the type of catalyst used to catalyze the reaction. However, it is preferred that the first acid or acid generator is present in an amount of from about 1 to about 500 parts per million based on the uretonimine-modified isocyanate composition. More preferably, the first quenching agent is present in an amount of from about 1 to about 100 parts per million based on the uretonimine-modified isocyanate composition.

The second quenching agent is also preferably a second acid or acid generator having a pKa of less than about −8.0. The second acid or acid generator is selected from at least one of trifluoromethanesulfonic acid and perchloric acid. It is to be appreciated that the second acid or acid generator may include a solvent for dispersing the acid or acid generator. Trifluoromethanesulfonic acid has a pKa of about −13 to about −14 and perchloric acid has a pKa of about −10. It is to be appreciated that other strong second acids could also be used.

The second acid or acid generator is present in an amount of from about 1 to about 250 parts per million based on the uretonimine-modified isocyanate composition. Preferably, the second quenching agent is present in an amount of from about 1 to about 75 parts per million based on the uretonimine-modified isocyanate composition.

The following examples illustrate the production of the uretonimine-modified isocyanate composition, according to the subject invention and illustrating certain properties of the uretonimine-modified isocyanate composition, as presented herein, are intended to illustrate and not limit the invention.

EXAMPLES

A uretonimine-modified isocyanate composition is produced from a composition comprising the components according to Table 1 for Examples 1-9. The components that form the composition are listed in parts by weight, unless otherwise indicated.

TABLE 1

| Component | wt % |
| --- | --- |
| Polyisocyanate Composition | 99.4948 |
| Catalyst | .0005 |
| Color Inhibitor | .500 |
| First Quenching Agent | .0017 |
| Second Quenching Agent | .0030 |

To a 1-L round-bottomed flask, preheated to 60° C. and equipped with a mechanical stirrer, is charged Lupranate® M Isocyanate (about 98 wt % 4,4'-MDI and 2 wt % 2,4'-MDI), commercially available from BASF Corporation. Next, a solution of phospholene oxide catalyst dissolved in methyl ethyl ketone is added. The temperature is raised to about 105° C. and the reaction mixture is stirred until the % NCO value decreases from about 33.5% to about 29.5%.

Next, a quenching agent is added as shown in below in Table 2 listed in parts per million based upon the total parts of the uretonimine-modified isocyanate composition. Note that Example 2 include a single quenching agent and Examples 1 and 3-9 include a first quenching agent and a second quenching agent.

TABLE 2

| | 1st Quenching Agent | Amt | T, °C. | 2nd Quenching Agent | Amt | T, °C. |
|---|---|---|---|---|---|---|
| Ex. 1 | TFMSA | 27.4 | 105 | TFMSA | 26.9 | 50 |
| Ex. 2 | TFMSA | 52.7 | 105 | | | |
| Ex. 3 | MSA | 16.1 | 105 | TFMSA | 54.1 | 50 |
| Ex. 4 | MSA | 16.7 | 105 | TFMSA | 54.5 | 50 |
| Ex. 5 | TFMSA | 28.6 | 105 | TFMSA | 21.9 | 50 |
| | TFMSA | 28.6 | 105 | TFMSA | 25.3 | 50 |
| Ex. 6 | TFMSA | 25.5 | 105 | TFMSA | 26.7 | 50 |
| Ex. 7 | MSA | 15 | 105 | TFMSA | 53.3 | 50 |
| Ex. 8 | TFMSA | 25.8 | 105 | TFMSA | 27.7 | 58 |
| Ex. 9 | MSA | 16.4 | 105 | TFMSA | 30.2 | 55 |

TFMSA is trifluoromethane sulfonic acid and is a very strong acid having a pKa of about −13. MSA is methanesulfonic acid and is less strong than TFMSA and has a pKa of about −2. Both TFMSA and MSA are added as solutions in diethyl malonate. The temperature is the temperature of the mixture when the quenching agent is added.

Table 3 indicates the amount of color inhibitor used in parts per million based upon the total parts of the uretonimine-modified isocyanate composition and when the color inhibitor was added. Pre-add refers to adding the color inhibitor prior to adding the catalyst, i.e. before reacting the polyisocyanate composition and post-add refers to adding the color inhibitor after quenching with the first quenching agent. Cold-add refers to adding the color inhibitor to a previously formed uretonimine-modified isocyanate composition. Additionally, Examples 2 and 8-9 included additional additives as shown in parts per million based upon the total parts of the uretonimine-modified isocyanate composition. Table 3 also summarizes the color assessments for Examples 1-9. The color of liquid uretonimine-modified isocyanate compositions is measured with a BYK Gardner Model LCSII Colorimeter. The Colorimeter measures color spectrophotometrically, in tristimulus values, either XYZ or CIE L*a*b* (CIELAB). The tristimulus values can be converted to a color measurement value in a wide variety of conventional color scales including the Platinum-Cobalt Scale, APHA, and yellowness index. The color of MDI uretonimine samples is reported in the APHA color scale and CIELAB values. The higher APHA colors and higher b* values represent a darker yellow color.

TABLE 3

| | Other Additives | | Color Inhibitor | APHA | CIELAB | | |
|---|---|---|---|---|---|---|---|
| | Additive | Amt | Protocol | ppm | Color | L* | a* | b* |
| Ex. 1 | | | pre-add | 508 | 90 | 99.8 | −1.2 | 3.4 |
| Ex. 2 | TPP | 819 | pre-add | 510 | 85 | 99.7 | −1.1 | 3.3 |
| Ex. 3 | | | pre-add | 540 | 70 | 99.8 | −.8 | 2.7 |
| Ex. 4 | | | post-add | 497 | 66 | 99.3 | −.7 | 2.5 |
| Ex. 5 | | | post-add | 136 | 236 | 99.4 | −3.1 | 9.0 |
| | | | | 587 | 148 | 99.5 | −2.0 | 5.7 |
| Ex. 6 | | | pre-add | 254 | 123 | 99.3 | −1.4 | 4.6 |
| Ex. 7 | | | pre-add | 250 | 83 | 99.8 | −1.0 | 3.2 |
| Ex. 8 | TPP | 691 | pre-add | 527 | 62 | 99.7 | −.7 | 2.4 |
| Ex. 9 | TPP | 673 | pre-add | 109 | 58 | 99.8 | −.9 | 2.3 |

The color inhibitor is Tinuvin® 123 from Ciba Specialty Chemicals and has a $pK_B$ of about 9.6. The other additive is triphenyl phosphite and is added to assist in color reduction and stabilization. The other additives are generally added with the catalyst. From Table 3, the two stage quenching process further reduces the APHA color and CIELAB values.

Generally, commercially available uretonimine-modified isocyanate compositions have an APHA color ranging from about 500-1000 and a CIELAB b* ranging from about 25 to 50. Table 4 shows typical APHA and CIELAB color values of two commercially available MDI-based uretonimine-modified products, Lupranate® 219 and Lupranate® MM103 Isocyanate from BASF Corporation.

TABLE 4

| Sample | APHA Color | CIELAB | | |
|---|---|---|---|---|
| | | L* | a* | b* |
| Lupranate ® 219 | 909.8 | 97.5 | −7.7 | 31.7 |
| Lupranate ® 219 | 712.1 | 98.4 | −8.0 | 26.0 |
| Lupranate ® MM103 | >1000 | 88.8 | −2.9 | 46.2 |
| Lupranate ® MM103 | >1000 | 91.7 | −5.2 | 40.8 |

Comparing the APHA color and the CIELAB a* and b* values to Examples 1-9, Examples 1-9 are significantly lower than the commercially available uretonimine-modified isocyanate composition. Thus, the subject invention provides a reduced color uretonimine-modified isocyanate composition.

Additionally, the subject invention may be used to reduce color of previously formed uretonimine-modified isocyanate composition. The color inhibitor, Tinuvin® 123, was added in an amount of 516 ppm to Lupranate® 219. The color was monitored in a sample stored at room temperature and in a sample stored at 60° C. Gradual color reduction did occur in both samples as shown below in Table 5.

TABLE 5

| Storage temperature | Time after addition | APHA Color |
|---|---|---|
| 25° C. | 1 hour | 542 |
| | 45 hours | 353 |
| | 9 days | 196 |
| 60° C. | 1 hour | 314 |
| | 3 hours | 229 |
| | 6 hours | 198 |

From Table 5, the color inhibitor reduced the color by about 67% in both cases. It took approximately 9 days at room-temperature to achieve the same color reduction that was seen in the 60° sample in 6 hours.

Comparative Example 1 was prepared using the same process as Example 1 but with Tinuvin® 765 in place of Tinuvin® 123, as the color inhibitor. Table 6 indicates the amount of Tinuvin® 765 used, in parts per million based upon the total parts of the uretonimine-modified isocyanate composition when the color inhibitor was added.

TABLE 6

| | Color Inhibitor | | APHA Color | CIELAB | | |
|---|---|---|---|---|---|---|
| | Protocol | ppm | | L* | a* | b* |
| Comparative Example 1 | pre-add | 312 | 51 | 100.1 | −0.5 | 31.9 |

Examples 1, 3, and 4 and Comparative Example 1 were subjected to high-temperature accelerated stability testing to determine whether the color inhibitor had any detrimental effect on the long-term shelf stability of the uretonimine-modified isocyanate composition. The results of the stability test are shown in Table 7. In the stability test, which simulates the long-term storage stability at ambient temperatures, a sample is placed in a sealed plastic container and then stored in an 80° oven for 7 days. At the end of the testing period, the % NCO value of the sample is measured and compared with the initial (pre-test) % NCO value. The % decrease in NCO value is the measure of product stability. Acceptable stability is defined as a decrease in % NCO of about 6% or less. Samples judged to be unstable generally had a decrease in % NCO of about 6% or higher. In some cases the sample gelled or solidified after the 7-day testing, indicating extreme instability.

TABLE 7

|  | Color Inhibitor | ppm | % decrease in % NCO | Stability Test Result |
|---|---|---|---|---|
| Ex. 1 | Tinuvin ® 123 | 508 | 3.3 | Pass |
| Ex. 3 | Tinuvin ® 123 | 540 | 3.6 | Pass |
| Ex. 4 | Tinuvin ® 123 | 497 | 3.2 | Pass |
| Comparative Example 1 | Tinuvin ® 765 | 312 | solidified | Fail |

Tinuvin® 765, used in Comparative Example 1, is a hindered amine, bis(1,2,2,6,6-pentamethylpiperidin-4-yl) decanedioate, and has the formula shown below:

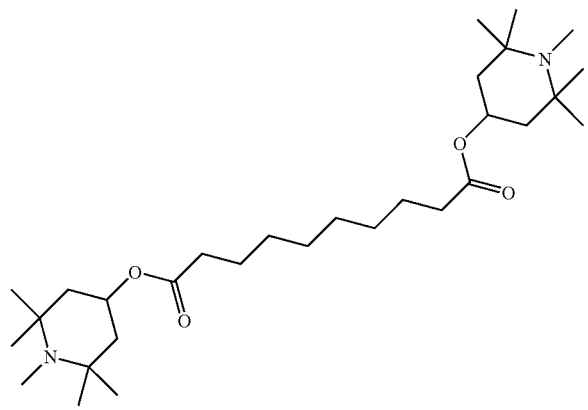

It is believed that Tinuvin® 765 has a $pK_B$ of less than about 7. It is known that hindered amines having a single methyl group have a $pK_B$ of from 5-7. The comparative example solidified when using the color inhibitor that was more basic, whereas the subject invention provides adequate stability.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of producing a uretonimine-modified isocyanate composition, said method comprising:

providing a polyisocyanate composition having two or more isocyanate groups and comprising 4,4'-diphenylmethane diisocyanate (MDI);

reacting the polyisocyanate composition at a temperature in a range of from about 80° C. to about 130° C. and in the presence of a catalyst such that the isocyanate groups form carbodiimides available for forming uretonimine and/or uretonimine oligomers;

quenching the reaction of the polyisocyanate composition with a quenching agent to inhibit formation of carbodiimides thereby inhibiting additional formation of additional uretonimine and/or uretonimine oligomers; and adding a color inhibitor having a pKB of greater than about 7 and having at least one hindered amine group.

2. A method as set forth in claim 1 wherein the uretonimine-modified isocyanate composition has a color value corresponding to an a* value of greater than about –10 and a b* value less than about 10 as defined by CIE L*a*b* (CIELAB) Color Space Specification.

3. A method as set forth in claim 1 wherein the uretonimine-modified isocyanate composition is stable and undergoes a % NCO group decrease of less than about 6 %.

4. A method as set forth in claim 1 wherein the color inhibitor is added in an amount of from about 50 to about 1500 parts per million based on the total parts of the uretonimine-modified isocyanate composition.

5. A method as set forth in claim 1 wherein the color inhibitor is selected from at least one of a hindered amino ether and a hindered amide.

6. A method as set forth in claim 5 wherein the hindered amino ether has the general formula:

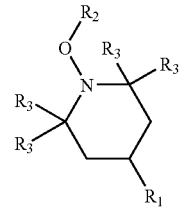

wherein R1 is selected from one of a hydrogen atom, a C1-C12 group, or a C1-C10 group having at least one carboxyl group, R2 is selected from one of a hydrogen atom or a C1-C12 group, and R3 are the same or different and are selected from one of a hydrogen atom or a C1-C8 group.

7. A method as set forth in claim 5 wherein the hindered amino ether has at least two hindered amine groups.

8. A method as set forth in claim 7 wherein the hindered amino ether has the general formula:

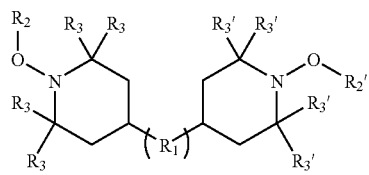

wherein R1 is selected from one of a C1-C12 group or a C1-C10 group having at least one carboxyl group, R2, R2' are the same or different and are selected from one of a hydrogen atom or a C1-C12 group, and R3, R3' are the same or different and are selected from one of a hydrogen atom or a C1-C8 group.

9. A method as set forth in claim 8 wherein R1 has the general formula:

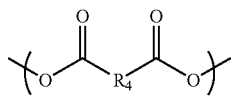

wherein R4 is a C1-C10 group.

10. A method as set forth in claim 5 wherein the hindered amide has the general formula:

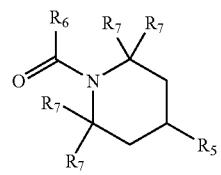

wherein R5 is selected from one of a hydrogen atom, a C1-C12 group, or a C1-C10 group having at least one carboxyl group, R6 is selected from one of a hydrogen atom or a C1-C12 group, and R7 are the same or different and are selected from one of a hydrogen atom or a C1-C8 group.

11. A method as set forth in claim 1 wherein the step of quenching the reaction is further defined as partially quenching the reaction with a first quenching agent and further quenching the reaction with a second quenching agent different than the first quenching agent.

12. A method as set forth in claim 11 further comprising the step of reducing the temperature below about 80° C. prior to further quenching the reaction with the second quenching agent.

13. A method as set forth in claim 11 wherein the first quenching agent has a pKa greater than the second quenching agent.

14. A method as set forth in claim 13 wherein the first quenching agent has a pKa of greater than about −8.0.

15. A method as set forth in claim 13 wherein the second quenching agent has a pKa of less than about −8.0.

16. A method as set forth in claim 13 wherein the first quenching agent is selected from at least one inorganic acid, carboxylic acid, peroxides, sulfinic acid, sulfonic acid, sulfonic acid halides, and carboxylic acid halides.

17. A method as set forth in claim 13 wherein the second quenching agent is selected from at least one of trifluoromethanesulfonic acid and perchloric acid.

18. A method as set forth in claim 1 wherein the catalyst is selected from at least one of phospholene, phospholene oxide, phospholidine, phospholidine oxide, phosphate esters, and phosphine oxides.

19. A method as set forth in claim 1 wherein the step of adding the color inhibitor is further defined as adding the color inhibitor before or during reaction of the polyisocyanate composition or after quenching the reaction with the quenching agent.

20. An article having reduced color formed from said method as set forth in claim 1.

21. A uretonimine-modified isocyanate composition comprising:

uretonimine and/or uretonimine oligomers formed from a reaction of a polyisocyanate composition having two or more isocyanate groups and comprising 4,4'-diphenylmethane diisocyanate (MDI); and a color inhibitor having a pKB of greater than about 7 and having at least one hindered amine group;

wherein said uretonimine-modified isocyanate composition has a color value corresponding to an a* value of greater than about −10 and a b* value less than about 10 as defined by CIE L*a*b* (CIELAB) Color Space Specification and wherein said uretonimine-modified isocyanate composition is stable and undergoes a % NCO group decrease of less than about 6 %.

22. A uretonimine-modified isocyanate composition as set forth in claim 21 wherein said color inhibitor is present in an amount of from about 50 to about 1500 parts per million based on the total parts of said uretonimine-modified isocyanate composition.

23. A uretonimine-modified isocyanate composition as set forth in claim 21 wherein said color inhibitor is selected from at least one of a hindered amino ether and a hindered amide.

24. A uretonimine-modified isocyanate composition as set forth in claim 23 wherein said hindered amino ether has the general formula:

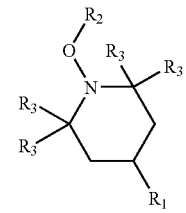

wherein R1 is selected from one of a hydrogen atom, a C1-C12 group, or a C1-C10 group having at least one carboxyl group, R2 is selected from one of a hydrogen atom or a C1-C12 group, and R3 are the same or different and are selected from one of a hydrogen atom or a C1-C8 group.

25. A uretonimine-modified isocyanate composition as set forth in claim 23 wherein said hindered amino ether has at least two hindered amine groups.

26. A uretonimine-modified isocyanate composition as set forth in claim 25 wherein said hindered amino ether has the general formula:

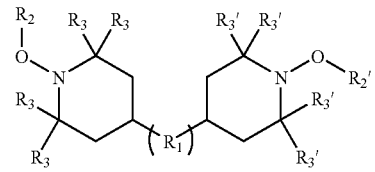

wherein R1 is selected from one of a C1-C12 group or a C1-C10 group having at least one carboxyl group, R2, R2' are the same or different and are selected from one of a hydrogen atom or a C1-C12 group, and R3, R3' are the same or different and are selected from one of a hydrogen atom or a C1-C8 group.

27. A uretonimine-modified isocyanate composition as set forth in claim 26 wherein R1 has the general formula:

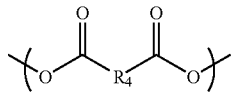

wherein R4 is a C1-C10 group.

28. A uretonimine-modified isocyanate composition as set forth in claim 23 wherein said hindered amide has the general formula:

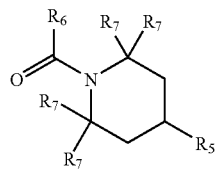

wherein R5 is selected from one of a hydrogen atom, a C1-C12 group, or a C1-C10 group having at least one carboxyl group,
R6 is selected from one of a hydrogen atom or a C1-C12 group, and
R7 are said same or different and are selected from one of a hydrogen atom or a C1-C8 group.

29. A uretonimine-modified isocyanate composition as set forth in claim 21 further comprising a first quenching agent and a second quenching agent different than said first quenching agent.

30. A uretonimine-modified isocyanate composition as set forth in claim 29 wherein said first quenching agent has a pKa greater than said second quenching agent.

31. A uretonimine-modified isocyanate composition as set forth in claim 30 wherein said first quenching agent has a pKa of greater than about −8.0.

32. A uretonimine-modified isocyanate composition as set forth in claim 30 wherein said second quenching agent has a pKa of less than about −8.0.

33. A uretonimine-modified isocyanate composition as set forth in claim 30 wherein said first quenching agent is selected from at least one inorganic acid, carboxylic acid, peroxides, sulfinic acid, sulfonic acid, sulfonic acid halides, and carboxylic acid halides.

34. A uretonimine-modified isocyanate composition as set forth in claim 30 wherein said second quenching agent is selected from at least one of trifluoromethanesulfonic acid and perchloric acid.

35. A uretonimine-modified isocyanate composition as set forth in claim 21 further comprising a catalyst selected from at least one of pholpholene, pholpholene oxide, phospholidine, phospholidine oxide, phosphate esters, and phosphine oxides to catalyze a reaction of the isocyanate groups to form the uretonimine and/or uretonimine oligomers.

* * * * *